(12) United States Patent
Ding et al.

(10) Patent No.: US 8,602,303 B1
(45) Date of Patent: Dec. 10, 2013

(54) LOW-ALTITUDE LOW-SPEED SMALL TARGET INTERCEPTING METHOD BASED ON FIRING TABLE FITTING

(71) Applicant: Beijing Mechanical Equipment Institute, Beijing (CN)

(72) Inventors: Xuchang Ding, Beijing (CN); Nuo Xu, Beijing (CN); Shengjie Wang, Beijing (CN); Yan Shen, Beijing (CN); Lianjun Wang, Beijing (CN); Xiaojun Wang, Beijing (CN); Jiahui Li, Beijing (CN); Hongliang Yan, Beijing (CN)

(73) Assignee: Beijing Mechanical Equipment Institute, Beijing (CN)

( * ) Notice: Subject to any disclaimer, the term of this patent is extended or adjusted under 35 U.S.C. 154(b) by 0 days.

(21) Appl. No.: 13/851,107

(22) Filed: Mar. 27, 2013

Related U.S. Application Data

(63) Continuation of application No. PCT/CN2011/076636, filed on Jun. 30, 2011.

(30) Foreign Application Priority Data

Nov. 22, 2010 (CN) .......................... 2010 1 0553163

(51) Int. Cl.
*G06G 7/80* (2006.01)

(52) U.S. Cl.
USPC ............................ 235/400; 235/403; 235/411

(58) Field of Classification Search
USPC .......................... 235/400, 403, 404, 411, 412
See application file for complete search history.

(56) References Cited

U.S. PATENT DOCUMENTS

| | | | | |
|---|---|---|---|---|
| 5,050,818 A | * | 9/1991 | Sundermeyer | 244/3.15 |
| 5,464,174 A | * | 11/1995 | Laures | 244/3.11 |
| 5,583,311 A | | 12/1996 | Rieger | |
| 5,662,291 A | * | 9/1997 | Sepp et al. | 244/3.13 |
| 5,710,423 A | * | 1/1998 | Biven et al. | 244/3.1 |
| 5,862,496 A | * | 1/1999 | Biven | 701/3 |
| 5,936,229 A | * | 8/1999 | Livingston | 250/203.2 |
| 6,231,002 B1 | * | 5/2001 | Hibma et al. | 244/3.22 |
| 6,626,077 B1 | | 9/2003 | Gilbert | |
| 6,666,401 B1 | * | 12/2003 | Mardirossian | 244/3.11 |
| 6,739,547 B2 | * | 5/2004 | Redano | 244/3.14 |
| 7,104,496 B2 | * | 9/2006 | Chang | 244/3.19 |
| 8,100,359 B2 | * | 1/2012 | Al-Qaffas | 244/110 C |

FOREIGN PATENT DOCUMENTS

| | | |
|---|---|---|
| CN | 85106886 A | 3/1987 |
| CN | 1527020 A | 9/2004 |
| CN | 101392999 A | 3/2009 |
| CN | 101982720 A | 3/2011 |
| WO | 2006/079029 A2 | 7/2006 |
| WO | 2008/029392 A2 | 3/2008 |
| WO | 2009/045573 A1 | 4/2009 |

OTHER PUBLICATIONS

First Office Action indicating allowance in CN Patent Application No. 201010553163.4; mailed Mar. 15, 2013.
Written Opinion of the International Searching Authority in PCT/CN2011/076636.

* cited by examiner

*Primary Examiner* — Daniel Hess
(74) *Attorney, Agent, or Firm* — Syncoda LLC; Feng Ma

(57) ABSTRACT

Systems and methods based on firing table fitting allow interception of a small low-altitude low-velocity target. A system includes: a target detecting system, a directing control system, a launch control system, an interception execution system, a communication bus a, a communication bus b and a communication bus c. Firing table data under a standard working condition and fitting parameters under different working conditions are pre-stored in the system. Based on target flight data and environment condition parameters, a lead aiming point is predicted, a time sequence of each stage of a fight flow is controlled, and firing data are output to execute an interception by the launch control system. An interception operation is simplified, a ground control of a non-controlled bomb fight flow is realized, a single shot success probability of an interception system is increased, and an interception cost is reduced.

1 Claim, No Drawings

LOW-ALTITUDE LOW-SPEED SMALL TARGET INTERCEPTING METHOD BASED ON FIRING TABLE FITTING

CROSS-REFERENCE TO RELATED APPLICATIONS

The present application is a continuation of PCT/CN2011/076636, filed Jun. 30, 2011, which claims priority to Chinese Patent Application No. 201010553163.4, filed Nov. 22, 2010, now Chinese Patent No. 201010553163.4. The disclosures of these references are hereby incorporated by reference in their entirety.

FIELD

The present disclosure relates to a method for intercepting a target in an airspace, and more particularly to a method based on firing table fitting for intercepting a small target with low altitude and low velocity.

BACKGROUND

A small target with low altitude and low velocity primarily constitutes a threat or destructive attack to important activities or large-scale gatherings. Because there is no effective means to defense such type of targets, conventional weapons such as a shotgun or large weapons such as an antiaircraft gun and an anti-aircraft missile are generally used to carry out security defense. However, the above methods have the following disadvantages.

(1) an effective range of a firearm is limited, and a quality requirement to an operator is high, and thus it is difficult to ensure an effective interception to a target in an airspace.

(2) a single shot success probability of the antiaircraft gun is relative low, so that generally multiple antiaircraft gun cooperation and multiple continuous shootings are required in order to shoot the target.

(3) although a single shot success probability of the anti-aircraft missile is high, usage and maintenance costs are relative high, resulting in a low return on investment.

(4) all the above weapons are destructive so that it is not suitable to be used in crowed areas. Moreover, noise, flash and smoke released by the weapons at a moment of shooting may cause a scare, and wreckages of the weapons may endanger people.

Therefore, with a principle of ballistic attack by the antiaircraft gun and a method for controlling firepower, influences of the noise, the flash and the smoke given by the weapons at a moment of shooting on an environment is reduced, an attack mode of a warhead is thus changed, and a special requirement of an usage environment may be satisfied. However, a single shot success probability of the method is relatively low in the case of low shooting speed of an ammunition, and it is impossible to perform a time sequence control on a non-controlled ammunition battle flow, and on the warhead.

SUMMARY

The present disclosure is aimed to provide a method based on firing table fitting for intercepting a small target with low altitude and low velocity to solve problems of low single shot success probability of an antiaircraft gun and no time sequence control on a non-controlled bomb fight flow and a warhead.

A method based on firing table fitting for intercepting a small target with low altitude and low velocity is realized by a turret type intercepting system. The system comprises: a target detecting system, a directing control system, a launch control system, an interception execution system, a communication bus a, a communication bus b and a communication bus c. The target detecting system is connected with the directing control system via the communication bus a, the launch control system is connected with the directing control system via the communication bus b, a firing table is loaded in a fire control computer of the launch control system, and the interception execution system is connected with the launch control system via the communication bus c.

The method comprises steps of:

step 1, obtaining target data information by the target detecting system, comprising:

determining a target state and obtaining target flight data including a flight height, a distance, an azimuth angle, and a pitch angle by the target detecting system, sending the target state and the target flight data to the directing control system via the communication bus a, sending the target flight data and environment condition parameters including a temperature, an altitude, a wind speed and a wind direction to the launch control system via the communication bus b by the directing control system;

step 2, predicting a lead aiming point by the launch control system, comprising:

calculating a flight path of the target by the fire control computer of the launch control system based on the target flight data and environment condition parameters received, wherein the calculation formulas include:

$$V_x = \frac{dx}{dt} = \frac{dD_S}{dt}\cos\varepsilon_S\cos\beta_S - \frac{d\varepsilon_S}{dt}D_S\sin\varepsilon_S\cos\beta_S - \frac{d\beta_S}{dt}D_S\cos\varepsilon_S\sin\beta_S \quad (1)$$

$$V_y = \frac{dy}{dt} = \frac{dD_S}{dt}\cos\varepsilon_S\cos\beta_S - \frac{d\varepsilon_S}{dt}D_S\sin\varepsilon_S\cos\beta_S + \frac{d\beta_S}{dt}D_S\cos\varepsilon_S\sin\beta_S \quad (2)$$

$$V_z = \frac{dz}{dt} = \frac{dD_S}{dt}\sin\varepsilon_S + \frac{d\varepsilon_S}{dt}D_S\cos\varepsilon_S \quad (3)$$

where $D_s$ is a target slant range, $\varepsilon_s$ is a target pitch angle, and $\beta_s$ is a target azimuth angle;

predicting a lead aiming point of a flight of the target with a three-dimensional spatial calculation by the launch control system, and a calculation formula is:

$$\begin{cases} D\cos\varepsilon\cos\beta - D_S\cos\varepsilon_S - V_x \cdot t_f = 0 \\ D\sin\varepsilon - D_S\sin\varepsilon_S - V_y \cdot t_f = 0 \\ D\cos\varepsilon\sin\beta - V_z \cdot t_f = 0 \\ t_f = f(D) \end{cases} \quad (4)$$

where a subscript "s" represents an initial position, D is a target slant range of the lead aiming point, $\varepsilon$ is a target pitch angle of the lead aiming point, $\beta$ is a target azimuth angle of the lead aiming point, and a flight time $t_f$ is determined according to an estimated value in a pre-stored firing table and is a function of D;

step 3, controlling a time sequence of each stage of a fight flow by the launch control system, comprising:

after an extraction of an aerodynamics parameter and a statistical comparison of an actual ballistic experimental data based on multi-projection angle and multi-environment working condition, obtaining firing table data under both a standard weather condition and a nonstandard weather condition, pre-storing the firing table data under the standard weather condition by the launch control system, and according to different environmental influence factors including the temperature, the altitude, the wind speed and the wind direction, storing the firing table data under the nonstandard weather condition by means of fitting parameters;

searching a corresponding fitting parameter according to the environmental influence factors by the fire control computer of the launch control system, obtaining an actual working condition firing table from a pre-stored standard firing table, inquiring the firing table according to the lead aiming point calculated by the launch control system to complete an interpolation calculation, thus obtaining an encounter time between a bullet and the target, a response time of the interception execution system and a start time of a warhead for binding a missile-borne computer;

step 4, outputting firing data to execute an interception by the launch control system, comprising:

according to the lead aiming point, using a spatial grid obtained from the firing table data to determine an effective intercepting ballistic trajectory by the fire control computer of the launch control system, outputting the firing data subsequent to a comparison of an initial position of the interception execution system, sending the firing data to the interception execution system via the communication bus c, the launch control system entering a nonreversible launch flow, and outputting a firing current to start launching by a launch execution structure in the launch control system.

Up to now, the interception of the small target with low altitude and low velocity based on firing table fitting is completed.

With the method according to embodiments of the present disclosure, an interception and an operation of the small target with low altitude and low velocity is simplified, a ground control of a non-controlled bomb fight flow is realized, a single shot success probability of an interception system is increased, and an interception cost is lowered.

DETAILED DESCRIPTION

A method based on firing table fitting for intercepting a small target with low altitude and low velocity is realized by a turret type intercepting system. The system comprises: a target detecting system, a directing control system, a launch control system, an interception execution system, a communication bus a, a communication bus b and a communication bus c. The target detecting system is connected with the directing control system via the communication bus a, the launch control system is connected with the directing control system via the communication bus b, a firing table is loaded in a fire control computer of the launch control system, and the interception execution system is connected with the launch control system via the communication bus c.

The method comprises the following steps.

In step 1, target data information is obtained by the target detecting system.

Specifically, a target state is determined and a target flight data is obtained by the target detecting system. The target flight data includes: a flight height, a distance, an azimuth angle and a pitch angle. Then the target state and the target flight data are sent to the directing control system via the communication bus a. Then the target flight data and environment condition parameters including a temperature, an altitude, a wind speed and a wind direction are sent to the launch control system via the communication bus b by the directing control system.

In step 2, a lead aiming point is predicted by the launch control system.

Specifically, a flight path of the target is calculated by the fire control computer based on the target flight data and environment condition parameters received. Calculation formulas may be as follows:

$$V_x = \frac{dx}{dt} = \frac{dD_S}{dt}\cos\varepsilon_S \cos\beta_S - \frac{d\varepsilon_S}{dt}D_S\sin\varepsilon_S\cos\beta_S - \frac{d\beta_S}{dt}D_S\cos\varepsilon_S\sin\beta_S \quad (1)$$

$$V_y = \frac{dy}{dt} = \frac{dD_S}{dt}\cos\varepsilon_S\cos\beta_S - \frac{d\varepsilon_S}{dt}D_S\sin\varepsilon_S\cos\beta_S + \frac{d\beta_S}{dt}D_S\cos\varepsilon_S\sin\beta_S \quad (2)$$

$$V_z = \frac{dz}{dt} = \frac{dD_S}{dt}\sin\varepsilon_S + \frac{d\varepsilon_S}{dt}D_S\cos\varepsilon_S \quad (3)$$

where $D_s$ is a target slant range, $\varepsilon_s$ is a target pitch angle, and $\beta_s$ is a target azimuth angle.

Then, a lead aiming point of a flight of the target is predicted with a three-dimensional spatial calculation by the launch control system. A calculation formula may be as follows:

$$\begin{cases} D\cos\varepsilon\cos\beta - D_S\cos\varepsilon_S - V_x \cdot t_f = 0 \\ D\sin\varepsilon - D_S\sin\varepsilon_S - V_y \cdot t_f = 0 \\ D\cos\varepsilon\sin\beta - V_z \cdot t_f = 0 \\ t_f = f(D) \end{cases} \quad (4)$$

where a subscript "s" represents an initial position, D is a target slant range of the lead aiming point, $\varepsilon$ is a target pitch angle of the lead aiming point, $\beta$ is a target azimuth angle of the lead aiming point, and a flight time $t_f$ is determined according to an estimated value in a pre-stored firing table and is a function of D.

In step 3, a time sequence of each stage of a fight flow is controlled by the launch control system.

Specifically, after an extraction of an aerodynamics parameter and a statistical comparison of an actual ballistic experimental data based on multi-projection angle and multi-environment working condition, firing table data under both a standard weather condition and a nonstandard weather condition is obtained. Then only the firing table data under the standard weather condition is pre-stored by the launch control system. According to different environmental influence factors including the temperature, the altitude, the wind speed and the wind direction, the firing table data under the nonstandard weather condition is stored by means of fitting parameters.

Then a corresponding fitting parameter is searched according to the environmental influence factors by the fire control computer. Then an actual working condition firing table is obtained from a pre-stored standard firing table. Then the firing table is inquired according to the lead aiming point to complete an interpolation calculation, thus obtaining an encounter time between a bullet and the target, a response time of the interception execution system and a start time of a warhead for binding a missile-borne computer.

In step 4, firing data is output to execute an interception by the launch control system.

Specifically, according to the lead aiming point, a spatial grid obtained from the firing table data is used to determine an effective intercepting ballistic trajectory by the fire control computer. Then the firing data is output subsequent to a comparison of an initial position of the interception execution system. Then the firing data is sent to the interception execution system via the communication bus c. Finally, the launch control system enters a nonreversible launch flow, and a firing current is output to start launching by a launch execution structure in the launch control system.

Up to now, the interception of the small target with low altitude and low velocity based on firing table fitting is completed.

The invention claimed is:

1. A method based on firing table fitting for intercepting a small target with low altitude and low velocity by a turret type intercepting system, wherein the system comprises: a target detecting system, a directing control system, a launch control system, an interception execution system, a communication bus a, a communication bus b and a communication bus c, the target detecting system connected with the directing control system via the communication bus a, the launch control system connected with the directing control system via the communication bus b, a firing table loaded in a fire control computer of the launch control system, and the interception execution system connected with the launch control system via the communication bus c, characterized in that specific realization steps include:

step 1, obtaining target data information by the target detecting system, comprising:

determining a target state and obtaining a target flight data including a flight height, a distance, an azimuth angle and a pitch angle by the target detecting system, sending the target state and the target flight data to the directing control system via the communication bus a, sending the target flight data and environment condition parameters including a temperature, an altitude, a wind speed and a wind direction to the launch control system via the communication bus b by the directing control system;

step 2, predicting a lead aiming point by the launch control system, comprising:

calculating a flight path of the target by the fire control computer based on the target flight data and environment condition parameters received, and calculation formulas as:

$$V_x = \frac{dx}{dt} = \frac{dD_S}{dt}\cos\varepsilon_S\cos\beta_S - \frac{d\varepsilon_S}{dt}D_S\sin\varepsilon_S\cos\beta_S - \frac{d\beta_S}{dt}D_S\cos\varepsilon_S\sin\beta_S \quad (1)$$

$$V_y = \frac{dy}{dt} = \frac{dD_S}{dt}\cos\varepsilon_S\sin\beta_S - \frac{d\varepsilon_S}{dt}D_S\sin\varepsilon_S\sin\beta_S + \frac{d\beta_S}{dt}D_S\cos\varepsilon_S\cos\beta_S \quad (2)$$

$$V_z = \frac{dz}{dt} = \frac{dD_S}{dt}\sin\varepsilon_S + \frac{d\varepsilon_S}{dt}D_S\cos\varepsilon_S \quad (3)$$

where $D_s$ is a target slant range, $\varepsilon_s$ is a target pitch angle, and $\beta_s$ is a target azimuth angle;

predicting a lead aiming point of a flight of the target with a three-dimensional spatial calculation by the launch control system, and a calculation formula as, where a subscript "S" represents an initial position, and a flight time $t_f$ is determined according to an estimated value in a pre-stored firing table:

$$\begin{cases} D\cos\varepsilon\cos\beta - D_S\cos\varepsilon_S - V_x \cdot t_f = 0 \\ D\sin\varepsilon - D_S\sin\varepsilon_S - V_y \cdot t_f = 0 \\ D\cos\varepsilon\sin\beta - V_z \cdot t_f = 0 \\ t_f = f(D) \end{cases} \quad (4)$$

step 3, controlling a time sequence of each stage of a fight flow by the launch control system, comprising:

after an extraction of an aerodynamics parameter and a statistical comparison of an actual ballistic experimental data based on multi-projection angle and multi-environment working condition, obtaining firing table data under both a standard weather condition and a nonstandard weather condition, pre-storing the firing table data under the standard weather condition by the launch control system, and according to different environmental influence factors including the temperature, the altitude, the wind speed and the wind direction, storing the firing table data under the nonstandard weather condition by means of fitting parameters;

searching a corresponding fitting parameter according to the environmental influence factors by the fire control computer, obtaining an actual working condition firing table from a pre-stored standard firing table, inquiring the firing table according to the lead aiming point to complete an interpolation calculation, thus obtaining an encounter time between a bullet and the target, a response time of the interception execution system and a start time of a warhead for binding a missile-borne computer;

step 4, outputting firing data to execute an interception by the launch control system, comprising:

according to the lead aiming point, using a spatial grid obtained from the firing table data to determine an effective intercepting ballistic trajectory by the fire control computer, outputting the firing data subsequent to a comparison of an initial position of the interception execution system, sending the firing data to the interception execution system via the communication bus c, the launch control system entering a nonreversible launch flow, and outputting a firing current to start launching by a launch execution structure in the launch control system;

up to now, completing the interception of the small target with low altitude and low velocity based on firing table fitting.

* * * * *